(12) United States Patent
Park et al.

(10) Patent No.: US 11,646,457 B2
(45) Date of Patent: May 9, 2023

(54) METHOD FOR IMPROVING LIFETIME OF LITHIUM-SULFUR BATTERY

(71) Applicant: LG CHEM, LTD., Seoul (KR)

(72) Inventors: Intae Park, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 495 days.

(21) Appl. No.: 16/628,963

(22) PCT Filed: Jul. 4, 2018

(86) PCT No.: PCT/KR2018/007533
§ 371 (c)(1),
(2) Date: Jan. 6, 2020

(87) PCT Pub. No.: WO2019/022399
PCT Pub. Date: Jan. 31, 2019

(65) Prior Publication Data
US 2020/0227792 A1 Jul. 16, 2020

(30) Foreign Application Priority Data

Jul. 26, 2017 (KR) .................. 10-2017-0094637
Jul. 3, 2018 (KR) .................. 10-2018-0076878

(51) Int. Cl.
*H01M 10/44* (2006.01)
*H01M 4/136* (2010.01)
(Continued)

(52) U.S. Cl.
CPC .......... *H01M 10/44* (2013.01); *H01M 4/136* (2013.01); *H01M 4/5815* (2013.01);
(Continued)

(58) Field of Classification Search
CPC .... H01M 10/44; H01M 4/136; H01M 4/5815; H01M 10/052; H01M 10/0569; H01M 2004/028
See application file for complete search history.

(56) References Cited

U.S. PATENT DOCUMENTS 6,329,789 B1 12/2001 Gravrilov et al.
2002/0106561 A1 8/2002 Lee et al.
(Continued)

FOREIGN PATENT DOCUMENTS

CN 1354529 A 6/2002
CN 104218226 A 12/2014
(Continued)

OTHER PUBLICATIONS

Zhang, Sheng S. "A new finding on the role of LiNO3 in lithium-sulfur battery." Journal of Power Sources 322 (2016): 99-105. (Year: 2016).*

(Continued)

*Primary Examiner* — Brian R Ohara
*Assistant Examiner* — Aaron J Salter
(74) *Attorney, Agent, or Firm* — Birch, Stewart, Kolasch & Birch, LLP

(57) ABSTRACT

A method for producing a lithium-sulfur battery with an improved lifetime. This method includes an activation step of forming a positive electrode active material-derived compound from a compound including elemental sulfur by charging and discharging the lithium-sulfur battery, where the battery includes the compound including elemental sulfur and an electrolyte liquid. Additionally, the positive electrode active material-derived compound has a solubility of 1% by weight or greater in the electrolyte liquid. The lithium-sulfur battery may be charged and discharged in a range of greater than 2.0 V and less than 2.4 V in the (Continued)

activation step. Further, the lithium-sulfur battery may be charged and discharged 3 times to 10 times in the activation step. This method avoids a complicated application process of and active material in preparing a lithium-sulfur battery.

7 Claims, 6 Drawing Sheets

(51) Int. Cl.
*H01M 4/58* (2010.01)
*H01M 10/052* (2010.01)
*H01M 10/0569* (2010.01)
*H01M 4/02* (2006.01)

(52) U.S. Cl.
CPC ..... *H01M 10/052* (2013.01); *H01M 10/0569* (2013.01); *H01M 2004/028* (2013.01)

(56) References Cited

U.S. PATENT DOCUMENTS

| | | | |
|---|---|---|---|
| 2012/0315545 A1 | 12/2012 | Son et al. | |
| 2014/0079989 A1 | 3/2014 | Janakiraman et al. | |
| 2014/0255797 A1* | 9/2014 | Manthiram | H01M 10/0568 429/188 |
| 2016/0006084 A1 | 1/2016 | Kabacik | |
| 2017/0040808 A1 | 2/2017 | Zaghib et al. | |
| 2018/0034059 A1* | 2/2018 | Campbell | H01M 4/38 |
| 2018/0287208 A1* | 10/2018 | Sasaki | H01M 4/13 |

FOREIGN PATENT DOCUMENTS

| | | |
|---|---|---|
| EP | 2645524 A1 | 10/2013 |
| JP | 2003-518713 A | 6/2003 |
| JP | 4801304 B2 | 10/2011 |
| JP | 2016-514884 A | 5/2016 |
| JP | 2017-514435 A | 6/2017 |
| KR | 10-2005-0029973 A | 3/2005 |
| KR | 10-0550981 B1 | 2/2006 |
| KR | 10-2011-0118225 A | 10/2011 |
| KR | 10-2012-0135808 A | 12/2012 |
| KR | 10-2013-0045974 A | 5/2013 |
| KR | 10-2014-0096363 A | 8/2014 |
| KR | 10-2015-0088923 A | 8/2015 |
| KR | 10-2015-0133733 A | 11/2015 |
| WO | WO 01/47088 A2 | 6/2001 |
| WO | WO 2013/074772 A1 | 5/2013 |
| WO | WO 2015/157859 A1 | 10/2015 |
| WO | WO-2016130980 A1 * | 8/2016 .......... H01M 10/052 |
| WO | WO-2017061107 A1 * | 4/2017 .......... H01M 10/049 |

OTHER PUBLICATIONS

Extended European Search Report, dated Jun. 19, 2020 for European Application No. 18838815.1.

Wang et al., "Interface Polymerization Synthesis of Conductive Polymer/graphite Oxide@sulfur Composites for High-rate Lithium-sulfur Batteries," Electrochimica Acta, vol. 155. 2015 (Available online Dec. 26, 2014), pp. 54-60, XP029164380.

Fan et al., "Mechanism and Kinetics of $Li_2S$ Precipitation in Lithium-Sulfur Batteries", Advanced Materials, vol. 27, 2015, pp. 5203-5209.

Gerber et al., "3-Dimensional Growth of Li2S in Lithium-Sulfur Batteries Promoted by a Redox Mediator", Nano Letters, vol. 16, No. 1, 2016, 549-554.

International Search Report issued in PCT/KR2018/007533 (PCT/ISA/210), dated Feb. 25, 2019.

Noh et al., "A new insight on capacity fading of lithium-sulfur batteries: The effect of $Li_2S$ phase structure", Journal of Power Sources, vol. 293, 2015, pp. 329-335.

Su et al., "A strategic approach to recharging lithium-sulphur batteries for long cycle life", Nature Communications, vol. 4, Article No. 2985, 2013, pp. 1-8.

* cited by examiner

【Figure 1】
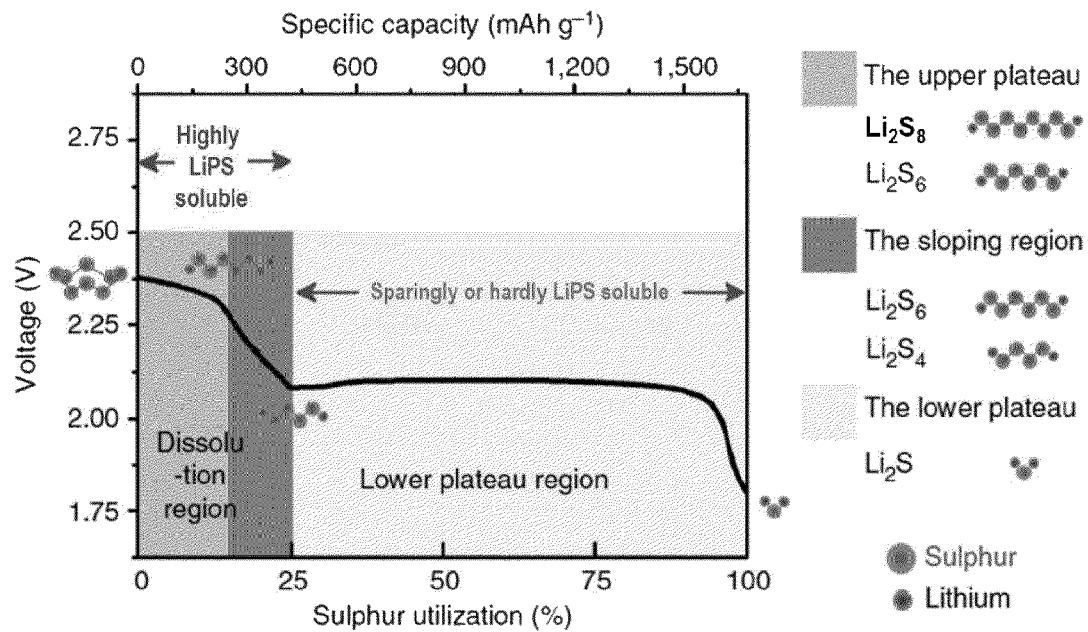
【Figure 2a】
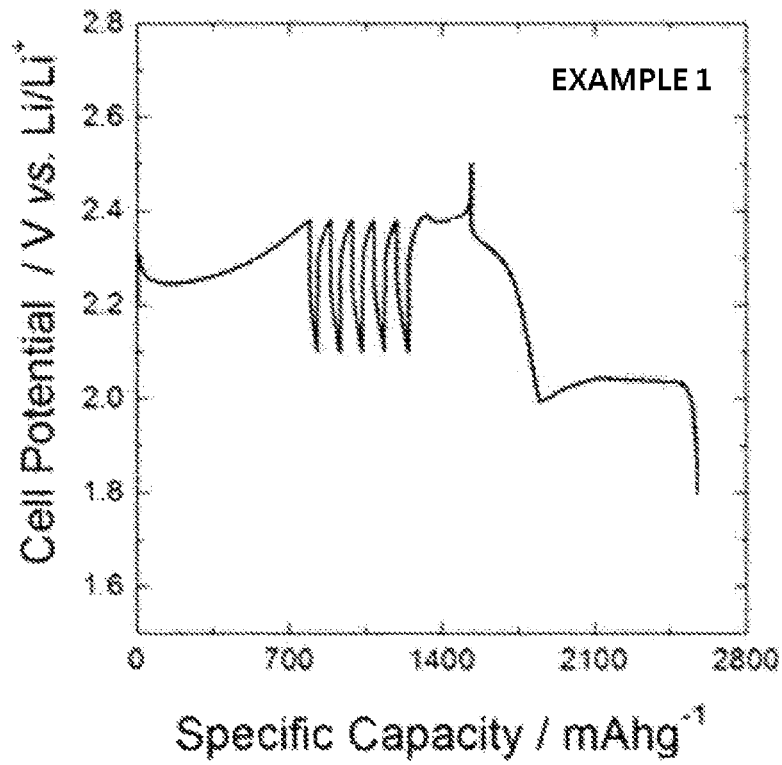

【Figure 2b】
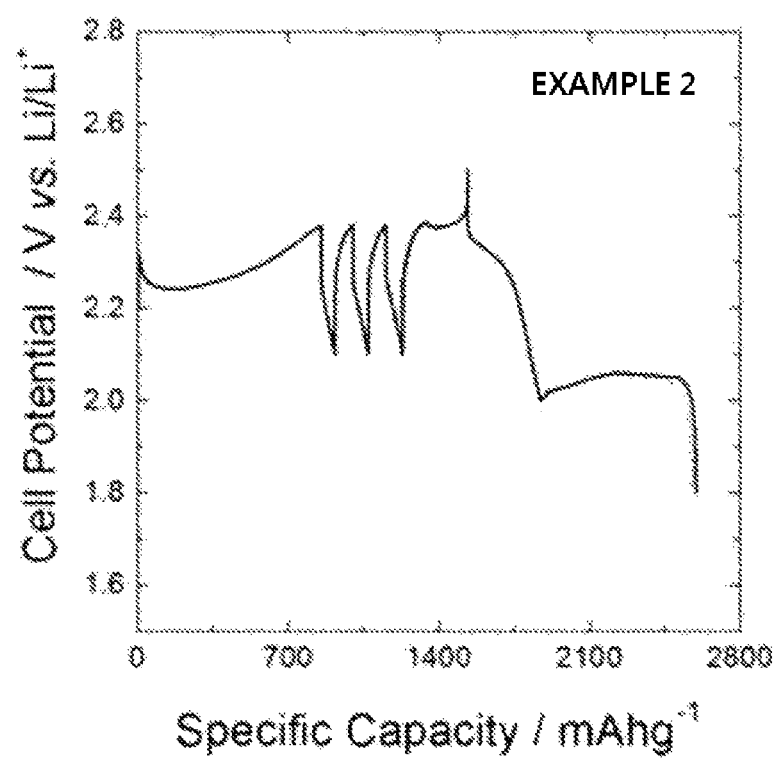

【Figure 2c】
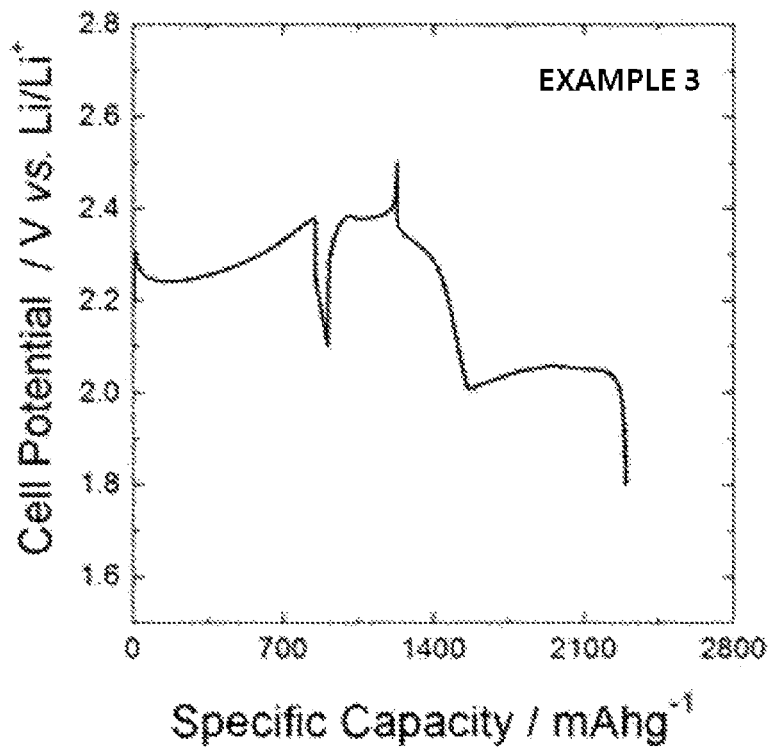
【Figure 2d】
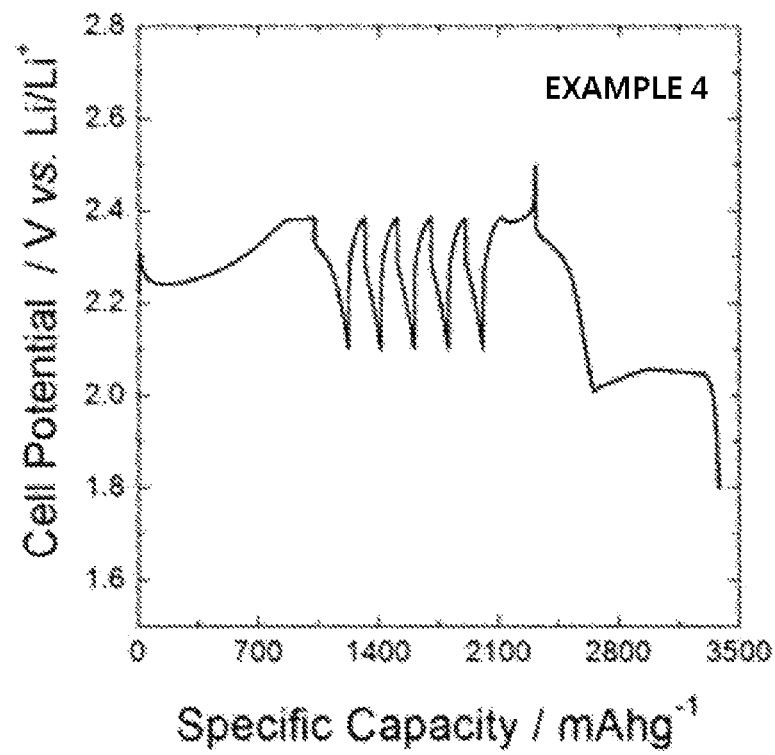

【Figure 2e】
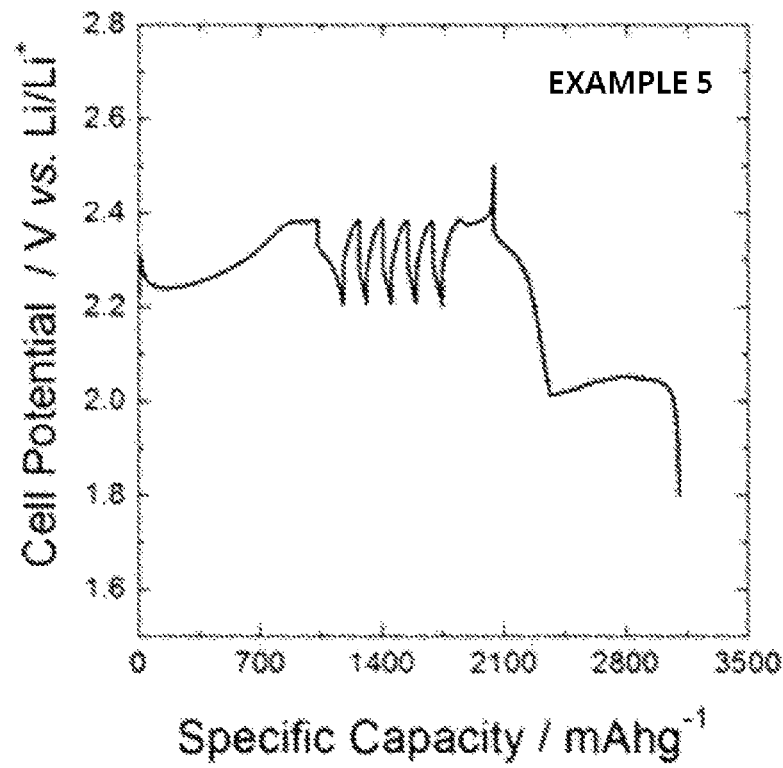
【Figure 2f】
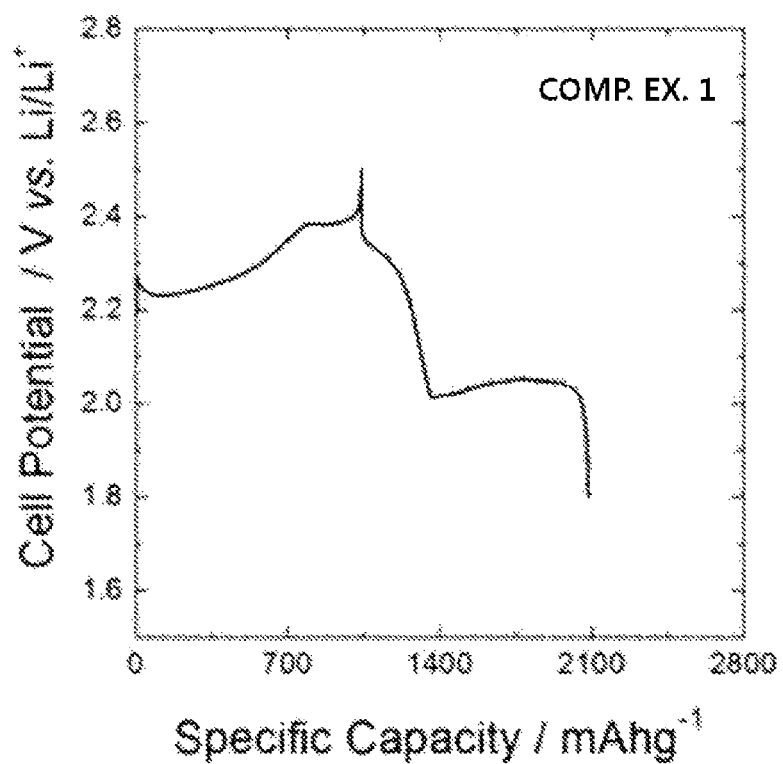

【Figure 2g】
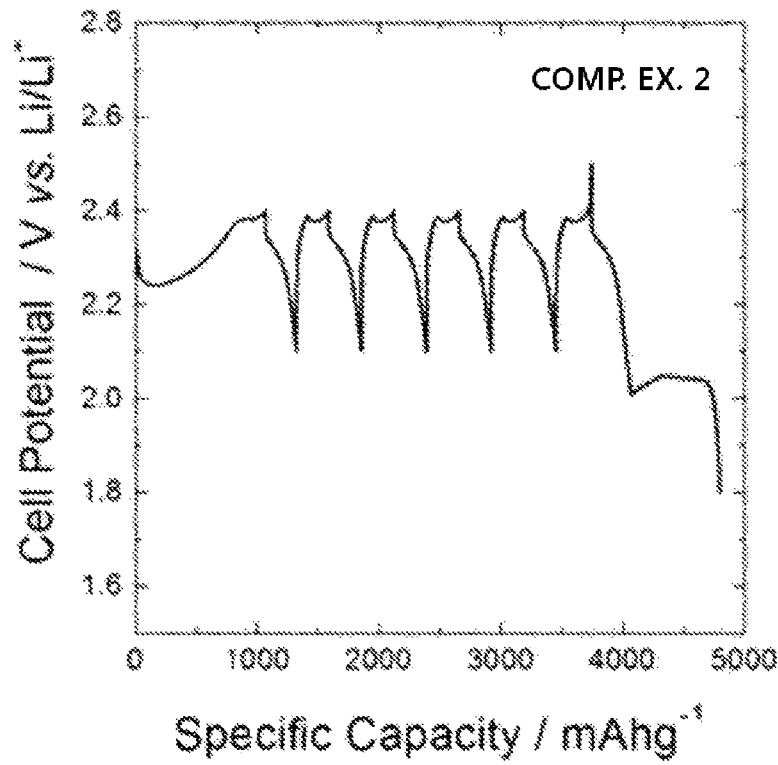
【Figure 2h】
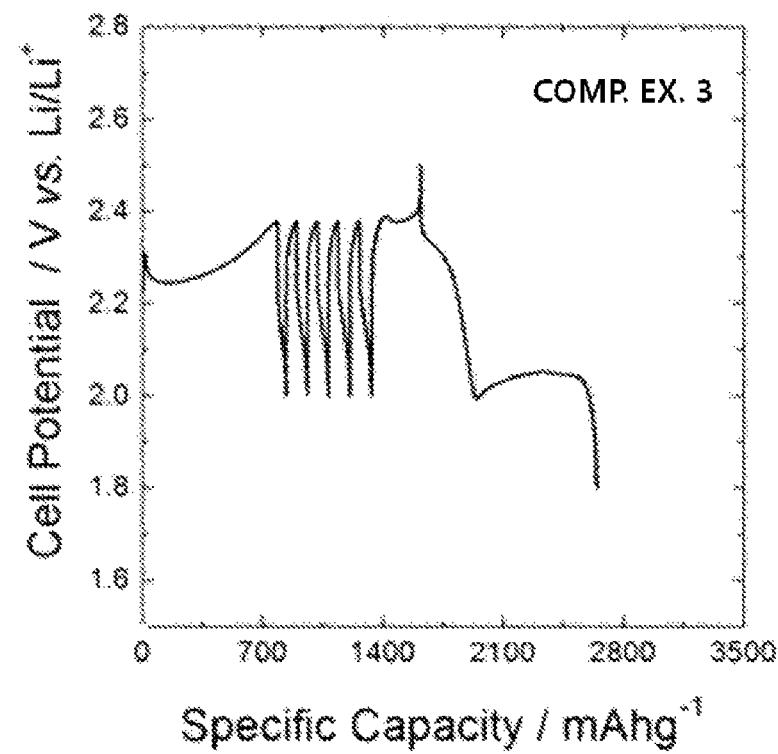

【Figure 3】
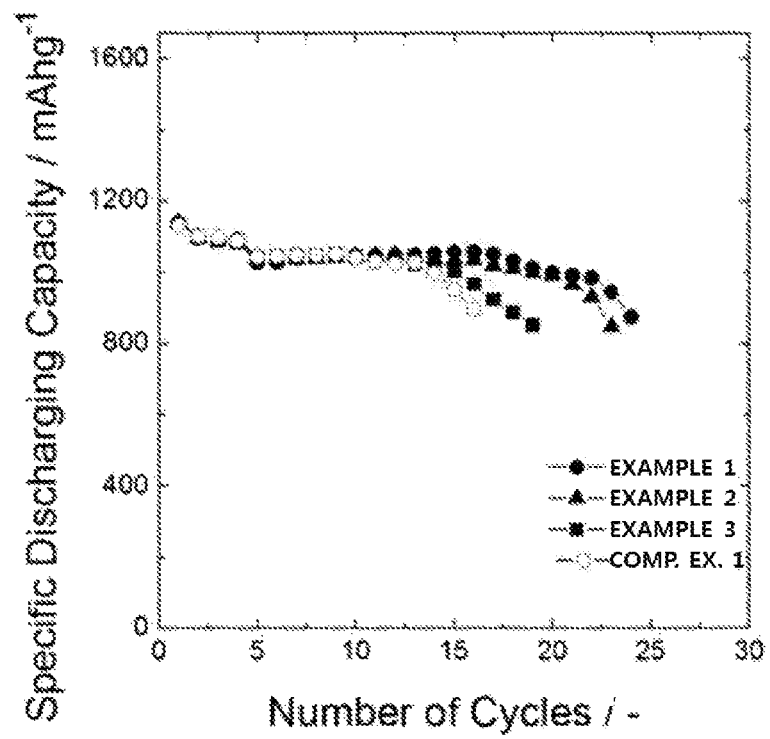
【Figure 4】
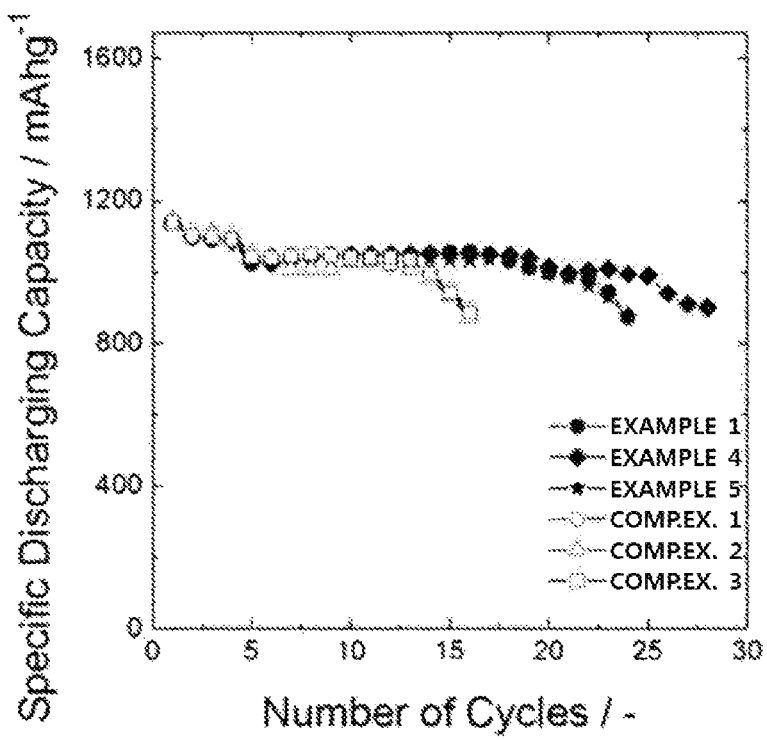

METHOD FOR IMPROVING LIFETIME OF LITHIUM-SULFUR BATTERY

TECHNICAL FIELD

This application claims priority to and the benefits of Korean Patent Application No. 10-2017-0094637, filed with the Korean Intellectual Property Office on Jul. 26, 2017, and Korean Patent Application No. 10-2018-0076878, filed with the Korean Intellectual Property Office on Jul. 3, 2018, the entire contents of which are incorporated herein by reference.

The present invention relates to a method for improving a lifetime of a lithium-sulfur battery, and in particular, to a method for improving a lifetime of a lithium-sulfur battery including an activation step of forming a positive electrode active material-derived compound having high solubility for an electrolyte liquid by charge and discharge of the battery.

BACKGROUND ART

With the development of portable electronic devices, electric vehicles and large capacity power storage systems, needs for large capacity batteries have arisen.

A lithium-sulfur battery is a secondary battery using a sulfur series material having sulfur-sulfur bonds (S—S bonds) as a positive electrode active material and using lithium metal as a negative electrode active material, and sulfur, a main material of the positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: 480 Wh/kg, Li—$MnO_2$ battery: 1,000 Wh/kg, Na—S battery: 800 Wh/kg), and therefore, has received attention as a battery having high energy density properties.

During a discharge reaction of a lithium-sulfur battery, an oxidation reaction of lithium occurs in a negative electrode (anode), and a reduction reaction of sulfur occurs in a positive electrode (cathode). Sulfur has a cyclic $S_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge).

During such a reaction, the sulfur is converted to linear-structured lithium polysulfide (LiPS) from cyclic $S_8$ by the reduction reaction, and as a result, lithium sulfide is lastly produced when such lithium polysulfide is completely reduced. By the process of being reduced to each lithium polysulfide, discharge behavior of a lithium-sulfur battery exhibits gradual discharge voltages unlike lithium ion batteries.

A concentration of lithium polysulfide in an electrolyte liquid rapidly increases during discharge in a high energy density Li—S battery, and herein, mobility of the electrolyte liquid decreases resulting in a pattern of a heterogeneous reaction of the battery. Due to such a heterogeneous reaction of the battery, deposition of lithium sulfide ($Li_2S$) and the like having low solubility is accelerated, and as a result, a battery lifetime is shortened.

In view of the above, studies for inducing a homogeneous reaction of a lithium-sulfur battery have been ongoing. As a method of inducing a homogeneous reaction of a lithium-sulfur battery studied so far, a method of changing a structure of a positive electrode formed with sulfur and a method of using a redox mediator as a positive electrode additive have been proposed. However, the methods are complicated in the application process, and the method of using a redox mediator particularly has a disadvantage of making synthesis difficult.

As an alternative to these methods, attempts of improving positive electrode reactivity by controlling a discharge rate or changing an electrolyte liquid composition using an additive have been made, however, significant effects are difficult to obtain even with such a method.

PRIOR ART DOCUMENTS

Non-Patent Documents (Non-Patent Document 1) Hyungjun Noh. et al, "A new insight on capacity fading of lithium sulfur batteries: The effect of $Li_2S$ phase structure", Journal of Power Sources 293 (2015) 329-335

(Non-Patent Document 2) Laura C. H. Gerber. et al, "3-Dimensional Growth of $Li_2S$ in Lithium-Sulfur Batteries Promoted by a Redox Mediator", Nano Letters

DISCLOSURE

Technical Problem

In view of the above, an aspect of the present invention provides a method for inducing a uniform reaction of a lithium-sulfur battery and improving lifetime properties of the battery therethrough by applying an activation step of charging and discharging existing materials in a specific range without using additional materials to a positive electrode, a negative electrode, an electrolyte liquid, a separator and the like.

Technical Solution

According to a first aspect of the present invention, there is provided a method for producing a lithium-sulfur battery with an improved lifetime. The method includes an activation step of forming a positive electrode active material-derived compound from a compound including elemental sulfur by charging and discharging the lithium sulfur battery. The lithium-sulfur battery includes the compound including elemental sulfur and an electrolyte. Further, the positive electrode active material-derived compound has a solubility of 1% by weight or greater in the electrolyte liquid.

In one specific embodiment of the present invention, the positive electrode active material-derived compound is a compound expressed by $Li_2S_n$, and herein, n is from 4 to 8.

In one specific embodiment of the present invention, the lithium-sulfur battery is charged and discharged at a 0.2 C-rate to 5 C-rate in the activation step.

In one specific embodiment of the present invention, the lithium-sulfur battery is charged and discharged in a range of greater than 2.0 V and less than 2.4 V in the activation step.

In one specific embodiment of the present invention, a potential difference in the charge and the discharge is greater than or equal to 0.1 V and less than 0.4 V in the activation step.

In one specific embodiment of the present invention, the lithium-sulfur battery is charged and discharged 3 times to 10 times in the activation step.

In one specific embodiment of the present invention, the lithium-sulfur battery includes 0.05 M to 1.0 M of the positive electrode active material-derived compound in the electrolyte liquid after the activation step.

Advantageous Effects

According to a method for improving a lifetime of a lithium-sulfur battery according to the present invention, there is an advantage of providing a lithium-sulfur battery with improved lifetime properties by adding an activation step of additional charge and discharge in a charge and discharge process of the lithium-sulfur battery without applying a particularly complicated application process.

DESCRIPTION OF DRAWINGS

FIG. 1 is a graph presenting a discharge profile of a general lithium-sulfur battery.

FIG. 2a is a graph presenting a profile for a $6^{th}$ charge and discharge cycle of a battery according to Example 1.

FIG. 2b is a graph presenting a profile for a $6^{th}$ charge and discharge cycle of a battery according to Example 2.

FIG. 2c is a graph presenting a profile for a $6^{th}$ charge and discharge cycle of a battery according to Example 3.

FIG. 2d is a graph presenting a profile for a $6^{th}$ charge and discharge cycle of a battery according to Example 4.

FIG. 2e is a graph presenting a profile for a $6^{th}$ charge and discharge cycle of a battery according to Example 5.

FIG. 2f is a graph presenting a profile for a $6^{th}$ charge and discharge cycle of a battery according to Comparative Example 1.

FIG. 2g is a graph presenting a profile for a $6^{th}$ charge and discharge cycle of a battery according to Comparative Example 2.

FIG. 2h is a graph presenting a profile for a $6^{th}$ charge and discharge cycle of a battery according to Comparative Example 3.

FIG. 3 is a graph presenting a profile for 30 charge and discharge cycles of batteries according to Examples 1 to 3 and Comparative Example 1.

FIG. 4 is a graph presenting a profile for 30 charge and discharge cycles of batteries according to Examples 1, 4 and 5 and Comparative Examples 1 to 3.

BEST MODE

Specific embodiments provided according to the present invention may all be accomplished by the following descriptions. The following descriptions needs to be understood as describing preferred specific embodiments of the present invention, and it needs to be understood that the present invention is not limited thereto.

Regarding numerical ranges in the specification below, an expression of "to" is used as a meaning including both an upper limit and a lower limit of a range, and when not including an upper limit or a lower limit, an expression of "less than", "greater than", "less than or equal to" or "greater than or equal to" is used in order to specifically express the inclusion.

In the present specification, "solubility" means solubility measured using the following solubility measuring method, and even when there is no particular mention on a temperature below, the solubility is solubility measured at room temperature (25° C.)

The present invention provides a method for improving a lifetime of a lithium-sulfur battery including an activation step of forming a positive electrode active material having high solubility for an electrolyte liquid by charge and discharge of the battery. The positive electrode active material produced through the activation step suppresses a heterogeneous reaction of the battery occurring in a positive electrode of the lithium-sulfur battery when charging and discharging the battery, and induces a homogeneous reaction of the battery. Through a homogeneous reaction of the battery, deposition of lithium sulfide ($Li_2S$) and the like is suppressed, and lifetime properties of the battery are improved therethrough.

The method according to the present invention is capable of improving a lifetime of a lithium-sulfur battery by being used in an existing lithium-sulfur battery without adding particular materials. Accordingly, the lithium-sulfur battery used in the present invention is not particularly limited as long as it is a battery used in the art. The lithium-sulfur battery used in the present invention basically includes a positive electrode, a negative electrode, an electrolyte liquid and a separator, and each constitution will be specifically described below.

Positive Electrode

The positive electrode of the lithium-sulfur battery according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material may include elemental sulfur (S8), sulfur series compounds or mixtures thereof. The sulfur series compound may specifically be $Li_2S_n$ (n≥1), an organosulfur compound, a carbon-sulfur polymer $((C_2S_x)_n\colon x=2.5$ to $50, n\geq 2)$ or the like. These may be used as a composite with a conductor since a sulfur material alone does not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoridehexafluoropropylene-tetrafluoroethylene copolymer, a vinylidene fluoride-perfluoromethyl vinyl ether-tetrafluoroethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in water or an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, N-methyl-2-pyrrolidone, acetonitrile, methanol, ethanol, tetrahydrofuran, water, isopropyl alcohol and the like may be included.

Negative Electrode

The negative electrode of the lithium-sulfur battery according to the present invention includes a negative electrode active material layer itself or a negative electrode active material layer formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions ($Li^+$), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

In addition, the negative electrode may be lithium metal or a lithium alloy. As nonlimiting examples, the negative electrode may be a thin film of lithium metal, or may be an alloy of lithium and one or more types of metals selected from the group consisting of Na, K, Rb, Cs, Fr, Be, Mg, Ca, Sr, Ba, Ra, Al and Sn.

Electrolyte Liquid

The electrolyte liquid of the lithium-sulfur battery according to the present invention is a lithium salt-containing non-aqueous electrolyte liquid, and is formed with a lithium salt and a solvent.

The lithium salt is a material readily dissolved in a non-aqueous organic solvent, and, for example, may be one or more selected from the group consisting of LiCl, LiBr, LiI, $LiClO_4$, $LiBF_4$, $LiB_{10}Cl_{10}$, $LiB(Ph)_4$, $LiC_4BO_8$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, $LiN(C_2F_5SO_2)_2$, $LiN(SO_2F)_2$, chloroborane lithium, lower aliphatic carboxylic acid lithium, lithium tetraphenylborate and lithium imide. In one specific embodiment of the present invention, the lithium salt may preferably be lithium imide.

The concentration of the lithium salt may be from 0.1 M to 8.0 M and preferably from 0.5 M to 2.0 M depending on various factors such as an accurate composition of the electrolyte liquid mixture, solubility of the salt, conductivity of the dissolved salt, charge and discharge conditions of a battery, a working temperature, and other factors known in the lithium-sulfur battery field. When the lithium salt concentration is less than the above-mentioned range, conductivity of the electrolyte liquid may decrease causing decline in the battery performance, and when the lithium salt concentration is greater than the above-mentioned range, viscosity of the electrolyte liquid increases leading to a decrease in the lithium ion ($Li^+$) mobility, and therefore, a proper concentration is preferably selected in the above-mentioned range.

The non-aqueous organic solvent is a material capable of favorably dissolving the lithium salt, and preferably, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, diethylene glycol dimethyl ether, triethylene glycol dimethyl ether, tetraethylene glycol dimethyl ether, tetrahydroxy franc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and these may be used either alone or in a mixed solution form of two or more. In one specific embodiment of the present invention, the aprotic solvent is preferably dioxolane, dimethyl ether, or a combination thereof.

The non-aqueous electrolyte liquid for a lithium-sulfur battery of the present invention may further include a nitrate- or nitrite-based compound as an additive. The nitrate- or nitrite-based compound is effective in forming a stable film in a lithium electrode and enhancing charge and discharge efficiency. Such a nitrate- or nitrite-based compound is not particularly limited in the present invention, however, one type selected from the group consisting of inorganic nitrate or nitric compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) or ammonium nitrite ($NH_4NO_2$); organic nitrate or nitric compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite or octyl nitrite; organic nitro compounds such as nitromethane, nitropropane, nitrobutane, nitrobenzene, dinitrobenzene, nitropyridine, dinitropyridine, nitrotoluene or dinitrotoluene, and combinations thereof may be used, and preferably, lithium nitrate is used.

In addition, the non-aqueous electrolyte liquid may further include other additives for the purpose of improving charge and discharge properties, flame retardancy and the like. Examples of the additives may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

Separator

The separator of the lithium-sulfur battery of the present invention is a physical separator having a function of physically separating electrodes, and those commonly used as a separator may be used without particular limit, and particularly, those having an excellent electrolyte liquid moisture retention ability while having low resistance for ion migration of the electrolyte liquid are preferred.

In addition, the separator enables lithium ion transfer between the positive electrode and the negative electrode while separating or insulating the positive electrode and the negative electrode from each other. Such a separator may be formed with materials that are porous with 30% to 50% porosity, and non-conductive or insulating.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte liquid impregnation and ion conductive properties decrease, and effects of reducing an overvoltage and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

According to one preferred specific embodiment of the present invention, an ethylene homopolymer (polyethylene) polymer film is used as the separator, and a polyimide non-woven fabric is used as the buffer layer. Herein, the polyethylene polymer film preferably has a thickness of 10 μm to 25 μm and porosity of 40% to 50%.

The present invention provides a method for improving a lifetime of a lithium-sulfur battery having improved lifetime properties by conducting an activation step on the lithium-sulfur battery including the above-described constitution. The activation step will be specifically described below.

Activation Step

The "activation step" in the present invention means a step of forming a positive electrode active material-derived compound in the positive electrode of the lithium-sulfur battery through a charge and discharge process different from a charge and discharge cycle of the battery. A positive electrode active material of a lithium-sulfur battery is generally formed with a compound including elemental sulfur, and such a compound may be converted to lithium polysulfide through a reduction reaction during discharge. Accordingly, the positive electrode active material-derived compound may mean lithium polysulfide. Depending on the degree of the reduction reaction, lithium polysulfide such as $Li_2S_8$, $Li_2S_6$, $Li_2S_4$ and $Li_2S_2$ is formed, and when such lithium polysulfide is completely reduced, lithium sulfide ($Li_2S$) is finally produced.

FIG. 1 presents a discharge profile of a general lithium-sulfur battery. According to FIG. 1, discharge behavior appearing during a process of a positive electrode active material being reduced to lithium polysulfide by discharge shows a gradual discharge voltage unlike a lithium ion battery. Lithium polysulfide produced by reduction has varied solubility for an electrolyte liquid depending on the length of the chain formed with sulfur, in other words, the oxidation number of sulfur. Particularly, long-chain lithium polysulfide such as $Li_2S_8$ has high solubility for a hydrophilic electrolyte liquid. Lithium polysulfide dissolved in an electrolyte liquid performs a role of a redox mediator and thereby suppresses deposition of lithium sulfide ($Li_2S$) and the like and induces a homogeneous reaction of a positive electrode active material. The present invention improves a lifetime of the lithium-sulfur battery by forming lithium polysulfide capable of performing a role of a redox mediator through the activation step.

The positive electrode active material-derived compound formed through the activation step in the present invention may be a compound having solubility of 1% by weight or greater for an electrolyte liquid. Herein, having solubility of 1% by weight for an electrolyte liquid means that a maximum of 1 g of the positive electrode active material-derived compound may be dissolved in 100 g of an electrolyte liquid. The electrolyte liquid serving as a standard for solubility is selected within the above-mentioned range. A proper amount of the positive electrode active material-derived compound having the above-mentioned solubility may be dissolved in the electrolyte liquid through the activation step, and the dissolved compound may perform a role of a redox mediator. According to one specific embodiment of the present invention, the positive electrode active material-derived compound may be a compound represented by a chemical formula of $Li_2S_n$ (4≤n≤8). When n is less than 4 in the above-mentioned chemical formula, the compound is not favorably dissolved in the electrolyte liquid and thereby deposited in the positive electrode, which induces a heterogeneous reaction of a positive electrode active material.

In the present invention, the activation step is progressed under a preferable condition capable of producing the above-described positive electrode active material-derived compound.

In the activation step, a charge and discharge rate (C-rate) for conducting charge and discharge is not particularly limited, but may be 0.1 C-rate or greater and more preferably from 0.2 C-rate to 5 C-rate when considering practical availability of the present invention.

According to one specific embodiment of the present invention, the activation step may be conducted by charging and discharging the battery in a potential range of greater than 2.0 V and less than 2.4 V, preferably in a potential range of 2.1 V to 2.385 V. When discharging the battery to 2.0 V or less in the activation step, a compound having a low sulfur oxidation number is produced, and such a compound is not able to induce a homogeneous reaction of a positive electrode active material due to low solubility for an electrolyte liquid. In addition, when charging the battery to 2.4 V or greater in the activation step, a reduction reaction of a positive electrode active material decreases, and accordingly, the amount of the positive electrode active material-derived compound production decreases as well making it difficult to expect an effect for improving a lifetime.

In the activation step, a difference between charge potential and discharge potential during charge and discharge may be in a range of greater than or equal to 0.1 V and less than 0.4 V, preferably in a range of greater than or equal to 0.15 V and less than 0.3 V, and more preferably in a range of 0.185 V to 0.285 V. The upper limit of the range is a maximum value specified considering the charge and discharge potential range described above, and the lower limit of the range is a minimum value capable of producing a proper amount of the positive electrode active material-derived compound through the activation step.

The number of preferred charge and discharge may be from 3 times to 10 times in the activation step. When the number of charge and discharge is less than 3 times, an effect of improving a lifetime obtained from the activation step may be insignificant, and when the number of charge and discharge is greater than 10 times, an enhanced lifetime improving effect is difficult to expect compared to when conducting charge and discharge 10 times. According to one specific embodiment of the present invention, the number of charge and discharge being from 3 times to 5 times may be efficient in the activation step.

The activation step may be preferably conducted after charging and discharging 5 times or more before the activation of the lithium-sulfur battery. The charge and discharge mean a general lithium-sulfur battery charge and discharge cycle, and this does not mean charge and discharge in the activation step. When the lithium-sulfur battery is charged and discharged 4 times or less, constant specific discharge performance of the battery is difficult to expect, and since there are no factors of performance decline caused by a heterogeneous reaction of the battery, lifetime properties of the battery are not improved through the activation step. The activation step may be conducted only in any specific cycle among charge and discharge cycles of the lithium-sulfur battery, or may be conducted in every charge and discharge cycle of the lithium-sulfur battery.

The lithium-sulfur battery may include 0.05 M to 1.0 M of the positive electrode active material-derived compound in the electrolyte liquid by the activation step. The positive electrode active material-derived compound dissolved in the electrolyte liquid performs a role of a redox mediator, and suppresses deposition of lithium sulfide ($Li_2S$) and the like and induces a homogeneous reaction of a positive electrode active material.

Battery Activation System

The method for improving a lifetime of a lithium-sulfur battery including the activation step described above may be implemented by a battery activation system. The battery activation system includes a module implementing the activation step. The module means one unit processing specific function or operation, and this may be implemented by hardware, software, or a combination of hardware and software. The battery activation system may be designed to monitor charge and discharge profiles of a battery, and have the module implementing the activation step operating when performance of the falls below a level predetermined by a user. In addition, since performance of the battery is not deteriorated by the activation step according to the present invention even when repeating the step a number of times, the battery activation system may be designed such that the module implementing the activation step operates randomly by a user. The battery activation system may be included as a part of constitutions in a product including the battery, and even when the system is not directly included in the product, it may be included in a part of constitutions in an auxiliary device of the product.

Hereinafter, preferred examples are provided in order to illuminate the present invention, however, the following examples are provided in order to more readily understand the present invention, and the present invention is not limited thereto.

EXAMPLE

Providing Lithium-Sulfur Battery

A lithium-sulfur battery used in the following examples is manufactured using the following method.

A composition for forming a positive electrode active material layer was prepared by mixing sulfur, Super-P (SP), a conductor and a binder using a ball mill with water as a solvent. Herein, denka black was used as the conductor, and as the binder, a binder in a mixed form of SBR and CMC was used. The mixing ratio of the sulfur and SP (9:1 ratio):conductor:binder was employed as 90:10:10 in a weight ratio. The prepared composition for forming a positive electrode active material layer was coated on an aluminum current collector and then dried to prepare a positive electrode (energy density of positive electrode: 2.5 mAh/$cm^2$).

After placing the prepared positive electrode and a negative electrode to face each other, a polyethylene separator having a thickness of 20 μm and porosity of 45% was provided between the positive electrode and the negative electrode.

After that, an electrolyte was injected into a case to manufacture a lithium-sulfur battery. Herein, the electrolyte was prepared by dissolving lithium bis(trifluoromethylsulfonyl)imide (LiTFSI) having a concentration of 1 M and 1 wt % of $LiNO_3$ in an organic solvent formed with dioxolane (DOL) and dimethyl ether (DME) (mixing volume ratio=1:1).

Example 1

For the above-described lithium-sulfur battery, a charge and discharge cycle was progressed 5 times, and from a charge and discharge cycle after the $6^{th}$, a charge and discharge cycle was progressed after conducting an activation step before progressing the charge and discharge cycle. In each of the cycles, the charge and discharge were performed at a 0.2 C-rate.

The activation step according to Example 1 was conducted in a manner of repeating a process of charging the battery to 2.38 V and then discharging to 2.1 V 5 times. The profile for the $6^{th}$ charge and discharge cycle including the activation step is presented in FIG. 2a.

Example 2

Example 2 was performed in the same manner as in Example 1 except that the activation step according to Example 2 was conducted in a manner of repeating a process of charging the battery to 2.38 V and then discharging to 2.1 V 3 times. The profile for the $6^{th}$ charge and discharge cycle including the activation step is presented in FIG. 2b.

Example 3

Example 3 was performed in the same manner as in Example 1 except that the activation step according to Example 3 was conducted in a manner of repeating a process of charging the battery to 2.38 V and then discharging to 2.1 V once. The profile for the 6$^{th}$ charge and discharge cycle including the activation step is presented in FIG. 2c.

Example 4

Example 4 was performed in the same manner as in Example 1 except that the activation step according to Example 4 was conducted in a manner of repeating a process of charging the battery to 2.385 V and then discharging to 2.1 V 5 times. The profile for the 6$^{th}$ charge and discharge cycle including the activation step is presented in FIG. 2d.

Example 5

Example 5 was performed in the same manner as in Example 1 except that the activation step according to Example 5 was conducted in a manner of repeating a process of charging the battery to 2.385 V and then discharging to 2.2 V 5 times. The profile for the 6$^{th}$ charge and discharge cycle including the activation step is presented in FIG. 2e.

Comparative Example 1

Unlike Example 1, a charge and discharge cycle was progressed without conducting the activation step. The profile for the 6$^{th}$ charge and discharge cycle that does not include the activation step is presented in FIG. 2f.

Comparative Example 2

Comparative Example 2 was performed in the same manner as in Example 1 except that the activation step according to Comparative Example 2 was conducted in a manner of repeating a process of charging the battery to 2.4 V and then discharging to 2.1 V 5 times. The profile for the 6$^{th}$ charge and discharge cycle including the activation step is presented in FIG. 2g.

Comparative Example 3

Comparative Example 3 was performed in the same manner as in Example 1 except that the activation step according to Comparative Example 3 was conducted in a manner of repeating a process of charging the battery to 2.38 V and then discharging to 2.0 V 5 times. The profile for the 6$^{th}$ charge and discharge cycle including the activation step is presented in FIG. 2h.

Experimental Example 1

For evaluating battery performance depending on the number of charge and discharge in the activation step, specific discharging capacity of the battery in each cycle was measured for Examples 1 to 3 and Comparative Example 1, and the results are shown in FIG. 3.

According to FIG. 3, it was identified that lifetime properties of the battery were improved in Examples 1 to 3 conducting the activation step compared to Comparative Example 1 that did not conduct the activation step. In addition, when comparing Example 1 with Examples 2 and 3, it was identified that the effect of improving lifetime properties of the battery was enhanced when performing the number of charge and discharge 3 times or more in the activation step.

Experimental Example 2

For evaluating battery performance depending on the charge and discharge potential in the activation step, specific discharging capacity of the battery in each cycle was measured for Examples 1, 4 and 5 and Comparative Examples 1 to 3, and the results are shown in FIG. 4.

According to FIG. 4, it was identified that, when charging and discharging to potential outside the range forming a positive electrode active material ($Li_2S_n$, $4 \leq n \leq 8$) having high solubility for an electrolyte liquid in the activation step as in Comparative Examples 2 and 3, lifetime properties of the battery were not improved at all by the activation step. In Comparative Example 2, $S_8$ solids were formed by charging to higher potential than the range exhibiting an improving effect in the activation step, and in Comparative Example 3, $Li_2S$ was formed by charging to lower potential than the range exhibiting an improving effect in the activation step. $S_8$ solids and $Li_2S$ formed through the activation steps of Comparative Examples 2 and 3 had low solubility for an electrolyte liquid, and therefore, even when conducting the activation step in Comparative Examples 2 and 3, an improvement in the lifetime properties of the battery is difficult to expect.

In addition, when considering Examples 4 and 5, it was identified that the effect obtained by the activation step was obtained even when charge potential was 2.385 V in the activation step as in Examples 4 and 5, and discharge potential was 2.2 V in the activation step as in Example 5.

Taking the results into account, in a lithium-sulfur battery, lifetime properties of the battery may be improved when charging and discharging the battery through an activation step for forming a positive electrode active material having high solubility for an electrolyte liquid. In addition, the degree of such improvement in the lifetime properties of the battery is affected by the number of charge and discharge, and charge and discharge potential in the activation step. Based on the above-described experimental results, the present invention provides a method for improving a lifetime of a lithium-sulfur battery including the activation step.

Simple modifications or changes in the present invention all fall within the scope of the present invention, and the specific scope of protection will be apparent from the attached claims.

The invention claimed is:

1. A method for producing a lithium-sulfur battery with an improved lifetime, comprising:
providing a positive electrode including a positive electrode active material formed on a positive electrode current collector, a negative electrode, an electrolyte liquid and a separator, wherein the positive electrode active material comprises a compound including elemental sulfur, and
an activation step of forming a positive electrode active material-derived compound from the compound including elemental sulfur by charging and discharging the lithium-sulfur battery,
wherein the positive electrode active material-derived compound has a solubility of 1% by weight or greater in the electrolyte liquid,
wherein the lithium-sulfur battery is charged and discharged in a range of greater than 2.0 V and less than 2.4 V in the activation step,
wherein the lithium-sulfur battery is charged and discharged at a 0.2 C-rate to a 5 C-rate in the activation step, wherein the lithium-sulfur battery is charged and discharged in a range of 3 times to 10 times in the activation step, and wherein the lithium-sulfur battery is charged and discharged 5 times or more from after the battery is manufactured to before the activation step.

2. The method of claim 1, wherein the positive electrode active material-derived compound is a compound represented by $Li_2S_n$ where n is from 4 to 8.

3. The method of claim 1, wherein a potential difference in the charge and the discharge is greater than or equal to 0.1 V and less than 0.4 V in the activation step.

4. The method of claim 1, wherein, in the lithium-sulfur battery, the electrolyte liquid comprises an aprotic solvent and a lithium salt.

5. The method of claim 4, wherein the aprotic solvent is dioxolane, dimethyl ether, or a combination thereof.

6. The method of claim 4, wherein the lithium salt is lithium imide.

7. The method of claim 1, wherein the lithium-sulfur battery comprises 0.05 M to 1.0 M of the positive electrode active material-derived compound in the electrolyte liquid after the activation step.

* * * * *